UNITED STATES PATENT OFFICE.

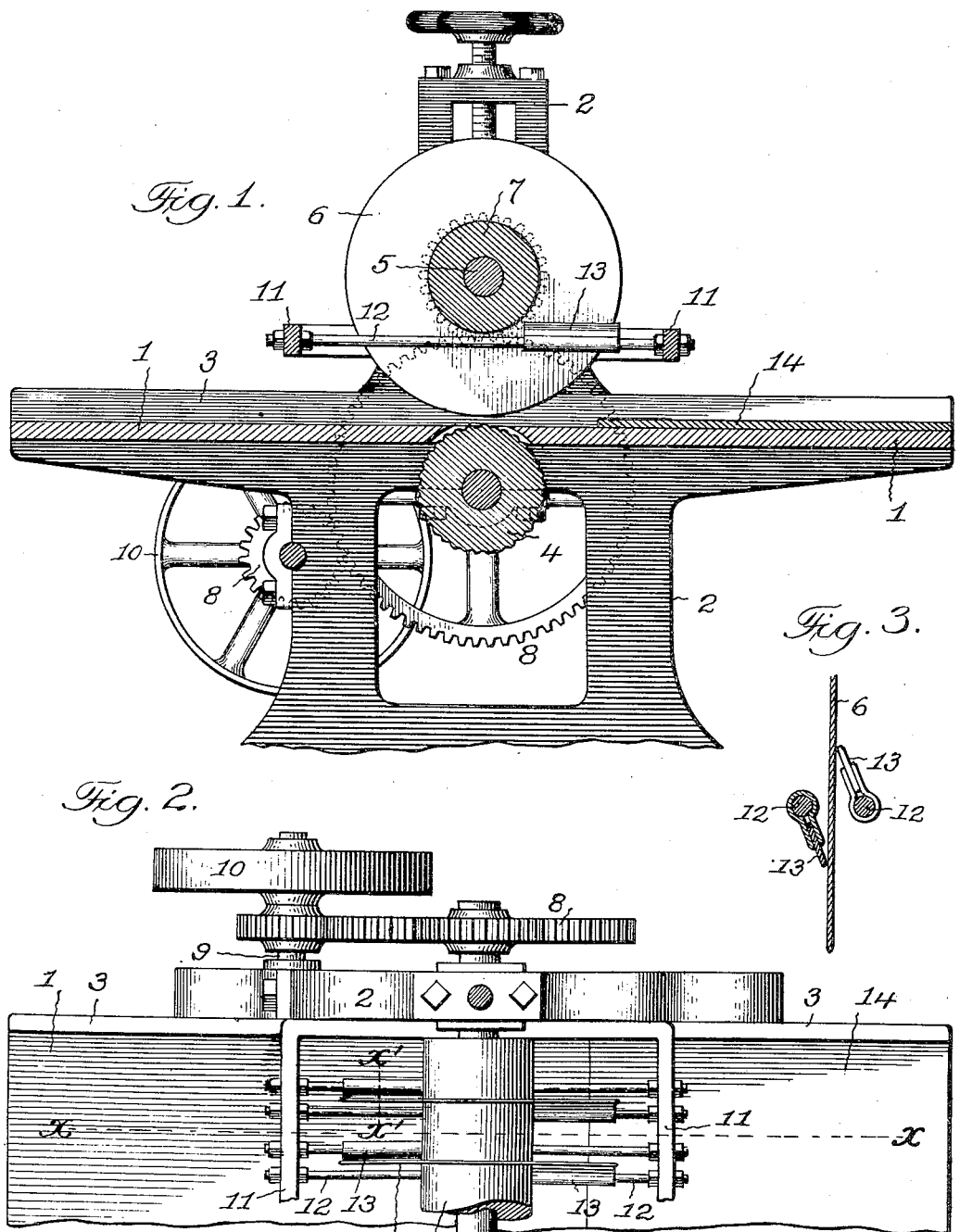

GEORGE F. DICKSON, OF CHICAGO, ILLINOIS, ASSIGNOR TO CONFECTIONERS AND BAKERS SUPPLY CO., OF CHICAGO, ILLINOIS, A CORPORATION OF ILLINOIS.

CUTTING-MACHINE.

980,145.　　　Specification of Letters Patent.　　Patented Dec. 27, 1910.

Application filed December 17, 1909. Serial No. 533,626.

*To all whom it may concern:*

Be it known that I, GEORGE F. DICKSON, a citizen of the United States of America, and a resident of Chicago, in the county of Cook and State of Illinois, have invented certain new and useful Improvements in Cutting-Machines, of which the following is a specification.

This invention relates to a machine for cutting ice-cream and like frozen materials into bricks of the required size, and has for its object to provide a simple and effective mechanism for attaining such result in a rapid and continuous manner, with an avoidance of the gradual accumulation of the frozen material on the cutter blades and consequent inferior work performed under such condition, all as will hereinafter more fully appear.

In the accompanying drawings:—Figure 1, is a longitudinal sectional elevation on line x—x, Fig. 2. Fig. 2, is a fragmentary plan view. Fig. 3, is an enlarged detail transverse section on line x'—x' Fig. 2.

Similar numerals of reference indicate like parts in the different views.

Referring to the drawings, 1 represents a horizontal board or table supported on an upright frame 2 and provided with marginal flanges 3 at its sides to confine the material acted upon to a longitudinal movement on the bed.

4 is a transverse feed roll, formed preferably with a corrugated periphery, and journaled in stationary bearings in the supporting frame 2. The upper surface or crown of said roll occupies a space left therefor in the board or table 1, and such crown is approximately level with the top surface of the board or table 1 as shown.

5 is a cutter carrying shaft journaled in vertically adjustable boxes carried by side standards of the frame 2 in the usual manner.

6 are a series of circular cutter blades secured in proper separated relation on the cutter carrying shaft 5 by circular separator disks or collars 7.

8 are the series of spur gears whereby positive rotation is communicated from the power driven shaft 9 of the machine to the cutter blades 6 and feed roll 4, and in the preferred construction of said gears the cutter 6 will have greater peripheral speed than the feed roll in order that said cutters may have a shearing cut through the material as distinguished from a pressure parting of the same.

10 is the driving pulley of the power driven shaft 9.

11 is a rectangular frame secured in a horizontal position inside of the vertical side standards of the supporting frame 2 and encompassing the series of cutter blades 6, on a plane below the carrying shaft 5 of said blades, as shown.

12 are a series of scraper carrying rods or bars attached to the frame 11 and extending through the spaces between the cutter blades 6 aforesaid. Said rods are arranged in pairs, with each pair individual to a cutter blade.

13, are the series of scrapers or wipers carried by the bars or rods 12 aforesaid. Said wipers are arranged in pairs, with each pair individual to a cutter blade of series of cutter blades 6 aforesaid and located at opposite sides of the carrying shaft 5 of the cutter blades, as shown. The described arrangement is adapted to afford a very effective scraping action of the scrapers or wipers 13 against the respective sides of the cutter blades 6, with ample and effective clearance space for the frozen material removed from said blades, so that frequent clogging of the parts is avoided in the continued use of the apparatus. And what is of equal importance to the practical merits of the mechanism, the surfaces of the cutter blades are maintained in a clean condition best adapted for the proper cutting of the ice-cream and the like into bricks.

14, is a sheet of semi-elastic material, such as linoleum, of a width equal to the table 1 and adapted to slide longitudinally thereon, and between and through a gap left between the feed roll 4 and the series of cutter blades 6 for such purpose. Said sheet 14 is intended to receive a cake or mass of the ice-cream and support and carry the same between the cutter blades in the operation of cutting such cake or mass into bricks. The sheet is also adapted to support the cut bricks in the subsequent handling and wrapping of said bricks, and to that end a number of said sheets 14 will be provided and used serially in the continued operation of the machine.

Having thus fully described my said invention what I claim as new and desire to secure by Letters Patent, is:—

1. In a cutting machine, the combination of a supporting frame, a table, a feed roll, a series of separated cutters revolubly mounted on said frame, a series of supporting rods carried by the frame and arranged in pairs, each pair being individual to a space between the cutter blades, and a series of scrapers mounted on said rods, each scraper being individual to one side of a cutter blade and having a clearance space with relation to the supporting rod of a companion scraper, substantially as set forth.

2. In a cutting machine, the combination of a supporting frame, a table, a feed roll, a series of separated cutters revolubly mounted on said frame, a series of supporting rods carried by the frame and arranged in pairs, each pair being individual to a space between the cutter blades and a series of scrapers mounted in alternate relation to the axis of revolution of the cutter blades on said rods, each scraper being individual to one side of a cutter blade and having a clearance space with relation to the supporting rod of a companion scraper, substantially as set forth.

3. In a cutting machine, the combination of a supporting frame, a table, a feed roll, a series of separated circular cutter blades, a rectangular frame inclosing the series of cutter blades, longitudinal rods carried by said frame, and extending through the spaces between the cutter blades and a series of scrapers carried by said rods and arranged in pairs, each pair being individual to a cutter blade and adapted to bear upon and have scraping engagement with opposite sides of the same, substantially as set forth.

4. In a cutting machine, the combination of a supporting frame, a table, a feed roll, a series of separated circular cutter blades, a rectangular frame inclosing the series of cutter blades, pairs of longitudinal rods carried by said frame, and extending through the spaces between the cutter blades and a series of scrapers arranged in pairs, each pair being individual to a cutter blade and arranged at opposite sides of said cutter blades and at opposite sides of the axis of rotation of the cutter blades, substantially as set forth.

Signed at Chicago, Illinois, this 15th day of December 1909.

GEORGE F. DICKSON.

Witnesses:
ROBERT BURNS,
HENRY MOE.